(12) United States Patent
Luethje et al.

(10) Patent No.: US 7,260,997 B2
(45) Date of Patent: Aug. 28, 2007

(54) DEVICE FOR ADJUSTING AND VERIFYING THE TENSION FORCE OF SCREWED CONNECTIONS

(75) Inventors: Holger Luethje, Halstenbek (DE); Jan-Hinrich Sick, Braunschweig (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 10/511,078

(22) PCT Filed: Apr. 11, 2003

(86) PCT No.: PCT/EP03/03773

§ 371 (c)(1),
(2), (4) Date: Mar. 16, 2005

(87) PCT Pub. No.: WO03/087748

PCT Pub. Date: Oct. 23, 2003

(65) Prior Publication Data

US 2005/0155434 A1    Jul. 21, 2005

(30) Foreign Application Priority Data

Apr. 12, 2002 (DE) ................................ 102 17 283

(51) Int. Cl.
*F16B 31/02* (2006.01)
(52) U.S. Cl. ........................................................ 73/761
(58) Field of Classification Search .................. 73/761
See application file for complete search history.

(56) References Cited

U.S. PATENT DOCUMENTS

| 3,151,258 | A | * | 9/1964 | Sonderegger et al. ........ 310/338 |
|---|---|---|---|---|
| 3,237,450 | A |   | 3/1966 | Brooks |
| 4,041,776 | A | * | 8/1977 | Payne ........................... 73/800 |
| 5,112,248 | A | * | 5/1992 | Kibblewhite et al. ........ 439/577 |
| 5,205,176 | A | * | 4/1993 | Kibblewhite .................. 73/761 |
| 5,280,725 | A | * | 1/1994 | Stengel ......................... 73/761 |
| 5,291,789 | A | * | 3/1994 | Walton .......................... 73/761 |
| 5,343,759 | A | * | 9/1994 | Hesthamar et al. ........... 73/761 |
| 5,437,525 | A |   | 8/1995 | Bras |
| 5,615,575 | A | * | 4/1997 | Goodwin ................ 73/862.541 |
| 5,717,143 | A | * | 2/1998 | Jenco et al. ................... 73/761 |
| 6,204,771 | B1| * | 3/2001 | Ceney ........................... 340/665 |

(Continued)

FOREIGN PATENT DOCUMENTS

DE    84 07 322.5 U1    5/1984

(Continued)

OTHER PUBLICATIONS

English translation of Office Action in the corresponding German application No. 10217283.8 issued by the German Patent and Trademark Office on Dec. 12, 2002.

*Primary Examiner*—Michael Cygan
*Assistant Examiner*—Octavia Davis
(74) *Attorney, Agent, or Firm*—Marshall & Melhorn, LLC

(57) ABSTRACT

The invention relates to a device for adjusting and/or verifying the axial force in screwed connections. The inventive device contains a control device for limiting an axial force acting between two force application elements of the screwed connection. To this end, the invention provides that the control device will record signal values from a measuring element whose electrical resistance varies according to the acting axial force.

9 Claims, 4 Drawing Sheets

U.S. PATENT DOCUMENTS

| | | |
|---|---|---|
| 6,250,863 B1 | 6/2001 | Kamentser et al. |
| 7,073,390 B2 * | 7/2006 | Luthje et al. ............ 73/777 |
| 2003/0089177 A1 | 5/2003 | Luethje et al. |

FOREIGN PATENT DOCUMENTS

| | | |
|---|---|---|
| DE | 3408310 A1 | 10/1984 |
| DE | 44 19 009 A1 | 12/1995 |
| DE | 693 11 479 T2 | 12/1997 |
| DE | 198 31 372 A1 | 1/2000 |
| DE | 199 54 164 A1 | 6/2001 |
| EP | 0 987 532 | 3/2000 |
| JP | 11285939 | 10/1999 |

* cited by examiner

DEVICE FOR ADJUSTING AND VERIFYING THE TENSION FORCE OF SCREWED CONNECTIONS

BACKGROUND OF THE INVENTION

The present invention concerns a device for adjusting and/or testing the axial tightening forces in screw joints.

The invention concerns above all mechanical screw joints which are used with different designs and in many ways in the field of mechanics. Basically, it can be applied to all known kinds of threads or screw joints.

Devices for adjusting the axial force in screw joints, including a check device for limiting an axial force operating between e.g. two force-applying elements of the screw joint, are already known. Thus so-called "torque wrenches" which allow mechanical overload control upon exceeding a given torque for a screw joint, are known. In this way, precise detection of the force between the force-applying elements (e.g. a bolt head on a bolt shank as the first force-applying element and a nut on a thread of the bolt shank as the second force-applying element) is not definitely possible. The torque which is applied to tighten a screw joint does cause a change in the axial force between the force-applying elements, as a rotational movement produces a change of distance between the force-applying elements and hence a change in axial force, due to the pitch of the thread of a bolt shank. However, the correlation between axial force and torque is under certain circumstances highly subject to errors, as the frictional forces of a force-applying element on a thread influence the torque critically. When the torques are identical, the tightening force of a screw joint can vary considerably, so that for bolts which slide easily there is a risk of overstretching, whereas in the case of stiff bolts the preselected torque is already attained when the parts to be connected are still loose. Apart from this imprecision, with the mechanical overload protection there is the drawback that only exceeding of the limit is possible, but not exact measurement of the axial force.

SUMMARY OF THE INVENTION

It is therefore the object of the present invention to propose a device for adjusting and/or testing the axial forces in screw joints, which can determine exactly the axial forces of a screw joint in a quick and cheap manner.

This object is achieved by a device for adjusting and testing the axial force in screw joints, wherein the device includes a check device for limiting an axial force operating between force-applying elements of the screw joint, wherein the check device has means for signal value pick-up from a measuring element whose electrical resistance is variable as a function of the operative axial force.

Due to the fact that the check device has means for signal value pick-up from a measuring element whose electrical resistance is variable as a function of the operative axial force, direct determination of the axial force is possible (without a diversion via torque measurement). The axial force can be applied by any force-applying elements (which can have any form and number), and it is essential that a resulting axial force is produced. A measurement of electrical resistance or a change of voltage occurring as a result in a measuring element which is mechanically loaded by the axial force, is used as the initial value. The measuring element can in this case be made of a material or coated with a material, as shown in DE 199 54 164 A1. This can be e.g. an amorphous, diamond-like carbon compound. To avoid repetition, reference is here made to all the materials which are listed in DE 199 54 164 A1. Naturally other piezoresistive materials are also possible for constructing the measuring element.

Advantageous developments of the present invention are provided in the dependent claims.

A particularly advantageous development provides that the device according to the invention has a component for fixing a rotatable force-applying element. The device can e.g. be designed as a spanner-like element which has, as the component for fixing a rotatable force-applying element, e.g. a nut, for encompassing a bolt. This nut can be in the form of known box spanner attachments, and also corresponding attachments for slotted-head or recessed-head bolts are possible. Naturally, any other forms are possible too, e.g. Allen key operations. The component for fixing the rotatable force-applying element (that is, e.g. a bolt head) can be rotatable relative to the remainder of the spanner ("ratchet" principle), but it can also be rigidly connected to the latter.

A further advantageous development provides that the fixing component includes means for signal pick-up. Thus e.g. a nut can have an electrical wire integrated or applied as a sheath, as well as contact pins which are electrically connected on the one hand to the measuring element and on the other hand to a measuring and control device belonging to the device according to the invention. Here, signal transmission can take place on the one hand by direct contact between electrically conductive surfaces. In addition to galvanic transmission, however, inductive or capacitive coupling of different signal value-transmitting wire sections is possible too (these variants are possible particularly when using the device in damp media or to reduce wear with relatively rotating components).

A further advantageous development provides that the means for signal value pick-up determine an axial force e.g. at only one location. For this purpose e.g. a contact pin is connected to a measuring element according to the invention (the voltage is then determined relative to an earth terminal which is provided via an electrical connection insulated from the contact pin, e.g. via electrically conductive bolt heads or nuts connected thereto.

It is, however, also possible to provide e.g. several contact pins for the simultaneous measurement of several signal values in order thus to obtain an even more precise averaged measuring signal (to compensate for temperature fluctuations or geometrical unevenness).

A development of the invention which is particularly suitable for practice provides that the component for fixing a rotatable force-applying element is designed for fixing a bolt head, a nut or the like. It is advantageous that here the means for signal value pick-up are likewise accommodated in the component for fixing the rotatable force-applying element (e.g. integral in a nut) and that these means for signal value pick-up directly contact, via e.g. contact pins, a washer to which an axial force is applied by the force-applying element (that is, bolt head, etc.).

A further advantageous development provides that a device for acoustic or optical indication of adjusted or existing axial force values is provided. In simple embodiments of the device according to the invention for detecting that values at the joint have been exceeded, a pilot lamp or signal sound device is necessary for this. For the indication of precise numerical values, an alphanumerical display is conceivable too. The tool according to the invention or the device according to the invention is, from experience, designed in such a way that on the basic tool, e.g. a ratchet, a cordless screwdriver or other screwing tools (including automatic screwdrivers), an electronic circuit with corresponding signal evaluation and indication as well as the necessary energy supply is provided. The energy can be provided by means of a battery or optically, capacitively or inductively coupled by telemetric devices using batteries or other energy storage means. The electrical supply of the measuring element can here be provided optionally by a d.c. or a.c. connection.

Basically, the device according to the invention can be used for all screw joints in the state of the art, that is, for screw joints with force-applying elements made of wood, metal or plastic. For fixing these screw joints, any elements from the state of the art can be used likewise, that is, recessed-head, slotted-head, hexagon, square or Allen-key bolts or the like.

Further advantageous developments of the present invention are provided in the other dependent claims.

BRIEF DESCRIPTION OF THE DRAWINGS

The invention will now be described with the aid of several figures. They show.

DESCRIPTION OF THE PREFERRED EMBODIMENTS

Figure 1:
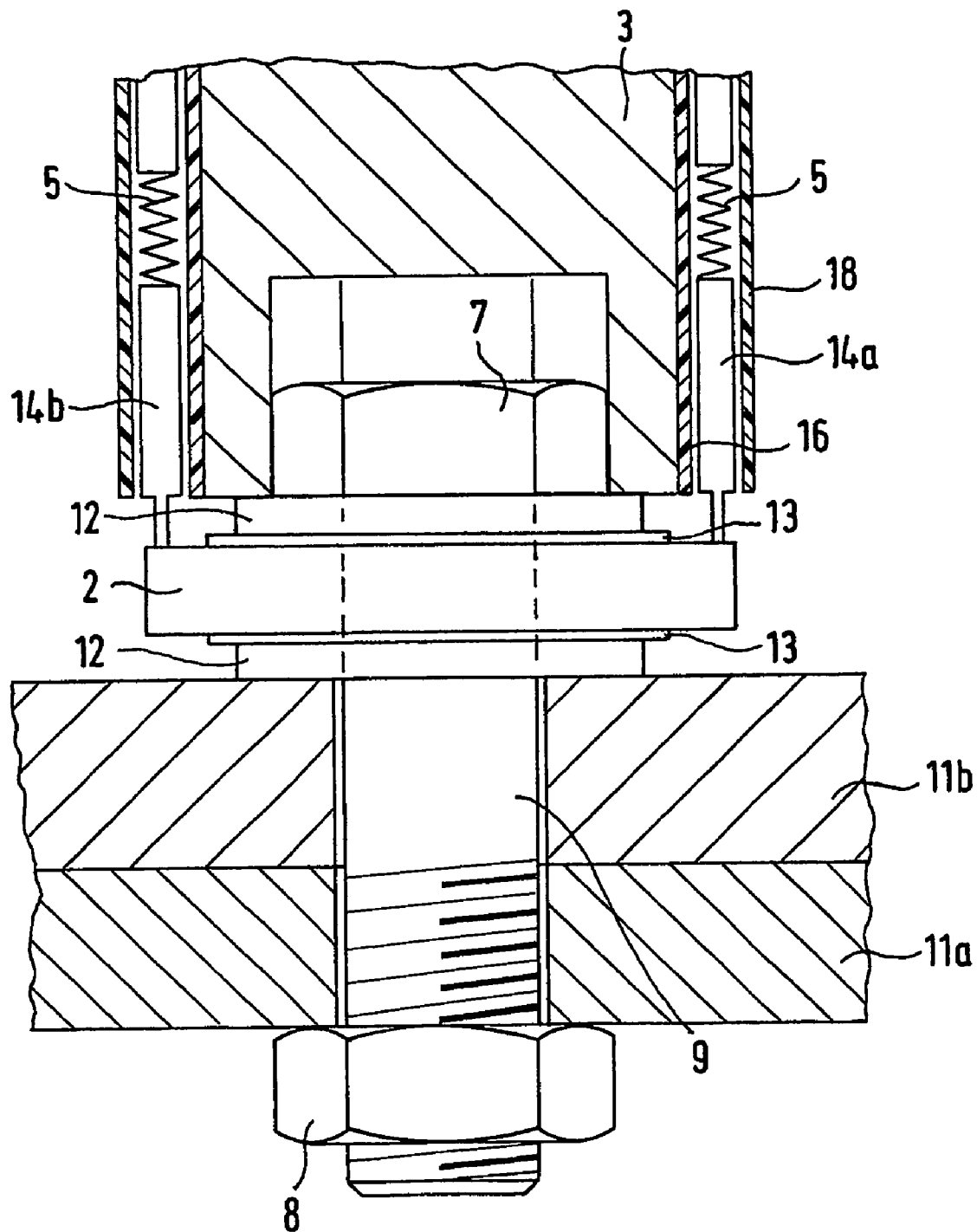
FIG. 1 part of the device for adjusting the axial force in a position placed on a screw joint, FIGS. 2a and 2b details of a component for fixing rotatable force-applying elements, FIG. 3 a detail of a contact pin for electrical contacting of a washer, FIGS. 4a and 4b views of a device according to the invention for adjusting the axial force, FIGS. 5a and 5b details of the electrical connection between a contact pin and an indicator according to the invention, and FIG. 6 various possible ways of electrically connecting a component for fixing a rotatable force-applying element, to an indicator according to the invention.

FIG. 1 shows a screw joint with part of a device 1 for adjusting and/or testing the axial force in screw joints, the device including a check device for limiting an axial force operating between two force-applying elements of the screw joint. The screw joint is produced by a bolt shank 9 at the upper end of which is mounted a hexagon bolt head 7 and at the lower end of which a nut 8 is screwed onto a thread. Between the nut and the bolt head 7 are (listed from the bottom up) a component 11a, a component 11b, an ancillary washer 12, an annular measuring element with piezoresistive coating, and a further ancillary washer. The axial force applied by turning the bolt head 7 therefore serves primarily for suitably adjustable connection of the components 11a and 11b. For easier adjustment, the nut 8 is mounted non-rotatably in a manner no longer shown on the component 11a.

The screw joint is shown only by way of example in FIG. 1. It may have any other form, e.g. a bolt with its thread can also be screwed direct into the component 11a, and in this case the bolt head 7 forms a first force-applying element and the component 11a itself forms the second force-applying element corresponding to this, an axial force being built up between the force-applying elements. But any other screw joints are conceivable as well, with different embodiments of bolts, nuts and materials of these elements (wood, metal or plastic). Instead of a hexagon head, the bolt head 7 may of course be designed as a recessed-head, slotted-head, square or Allen-key bolt or the like. The means according to the invention for signal value pick-up of the check device which belongs to the device, are connected to a measuring element 2 in FIG. 1. This measuring element has the property that its electrical resistance is variable as a function of the operative axial force. Suitable for this can be an amorphous carbon layer with graphitic structures with $sp^2$ hybridisation in combination with diamond-like structures with $sp^3$ hybridisation. With respect to the possible multiplicity of further materials, comprehensive reference is made to German patent application 199 54 164 A1. However, other piezoresistive materials known to the expert are possible too.

The measuring element 2 is substantially designed as a hollow circular cylinder, the central opening being used for passage of the bolt shank 9. The core of the hollow circular cylinder is made of a commercial steel (e.g. ST37). Naturally special steels, hardened steels, titanium, aluminium, etc. are also possible as materials, and also glass fibre-reinforced plastics. On the upper or lower side of this hollow circular cylinder are layers of material whose electrical resistance is variable as a function of the operative axial force (as described above). These layers do not, however, reach as far as the outermost circumference of the measuring element 2, and the annular space remaining up to the edge of the measuring element 2 is a segmented or unsegmented annular region for electrical contacting. This region is suitable for connection to contact pins 14a or 14b.

Via e.g. the contact pin 14a, a change of voltage is measurable by varying the electrical resistance in the force-measuring layers 13. The contact pin is connected in a manner which will be explained later to a control device of the device according to the invention. An earth terminal is also connected to this control device, and this electrical connection takes place via electrically conductive components between control device and measuring element 2 (that is, screwing attachment 15, bolt head 7, ancillary washers 12, etc.).

Below, the construction of the screwing attachment 3 will be considered in more detail. Firstly it has a shape which is at least in one region complementary to the bolt head 7, for turning the bolt head about the bolt shank axis. The screwing attachment 3, which thus constitutes a component for fixing the force-applying element 7, is made of an electrically conductive material, usually hardened special steel. The screwing attachment 3 can have a circular cylindrical shape and is coated on its outer peripheral surface with an insulator 16 (e.g. AL203 or an electrically non-conductive polymer). One or more spring-driven contact pins 14a, 14b are accommodated in an annular space which, seen radially outwardly, is defined by a further insulator layer in the form of a hollow circular cylinder.

It should be pointed out that the arrangement of contact pins 14a, 14b and washer 2 shown here is meant only as an example. Naturally it is also possible to provide a different form of a measuring element or to provide the washer in a protective case for protection against rotation.

Figure 2A:
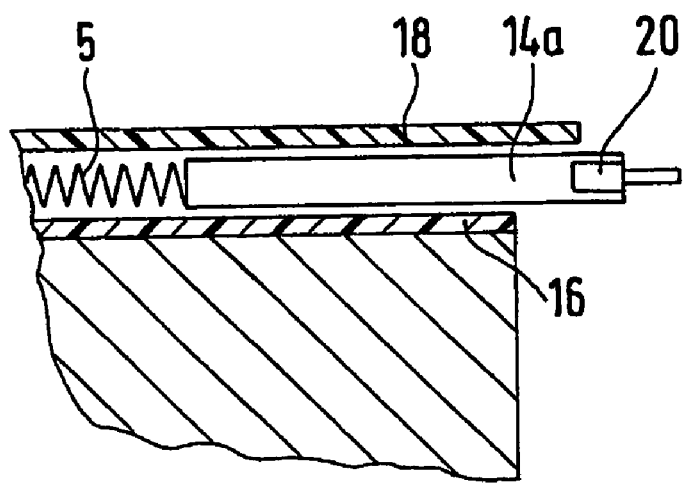
Figure 2B:
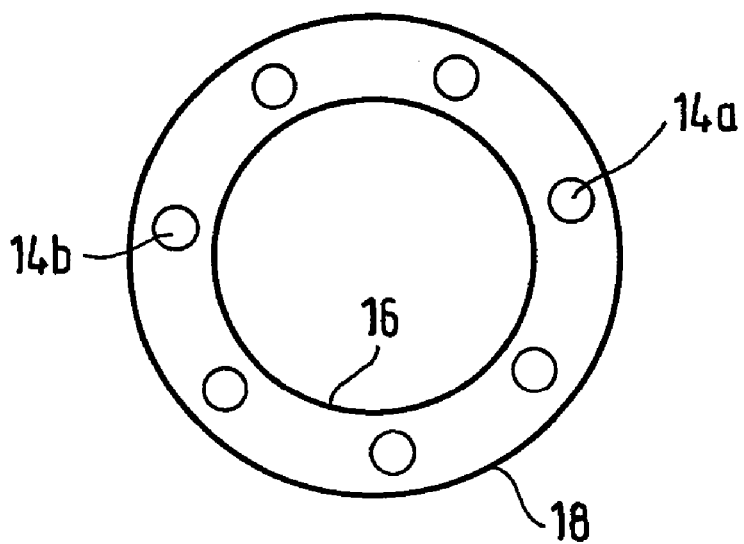

FIGS. 2a and 2b show partial views of the environment of the contact pins 14a, 14b. In FIG. 2a it can be seen how an arrangement of a spring 5 and the contact pin 14a, which is mounted between the cylindrical insulator layers 16 and 18, is accommodated. The spring 5 is electrically conductive in order to make a connection between the measuring element 2 and the control device, not shown here. The contact pin 14a has at its projecting end a tip for better fixing to the washer and hence for ensuring a better measuring connection. Instead of and/or in addition to the spring, fixing can also take place with magnets 20 mounted at the tip (however, this requires a ferromagnetic measuring device).

FIG. 2b shows a top view of several contact pins, inter alia the contact pins 14a and 14b. Basically, it is sufficient to provide a single contact pin 14a. However, to improve the quality of measurement (equalisation of geometrical unevenness or temperature compensations) several contact pins may be used, which are electrically connected to each other or electrically insulated from each other (for this purpose, if occasion arises segmented regions electrically insulated from each other and each connected to a corresponding contact pin 14a, 14b are to be provided on the measuring element 2).

Figure 3:
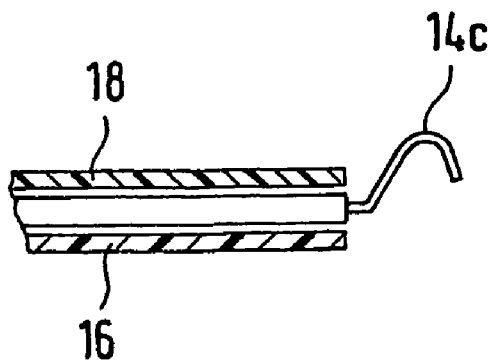

FIG. 3 shows a further embodiment of a contact pin 14c which differs from the above-mentioned embodiment only in that at its tip is provided a hook-like device as a crimping contact for better fixing/contacting of the measuring element 2.

Figure 4A:
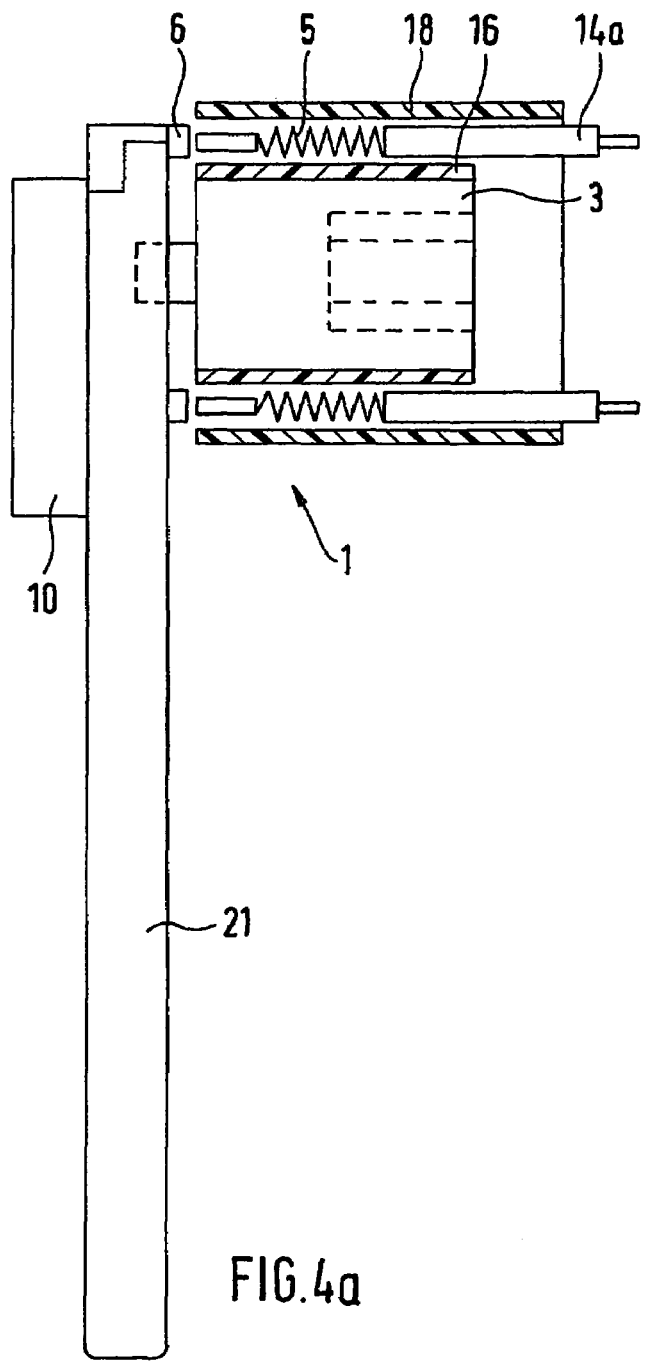
Figure 4B:
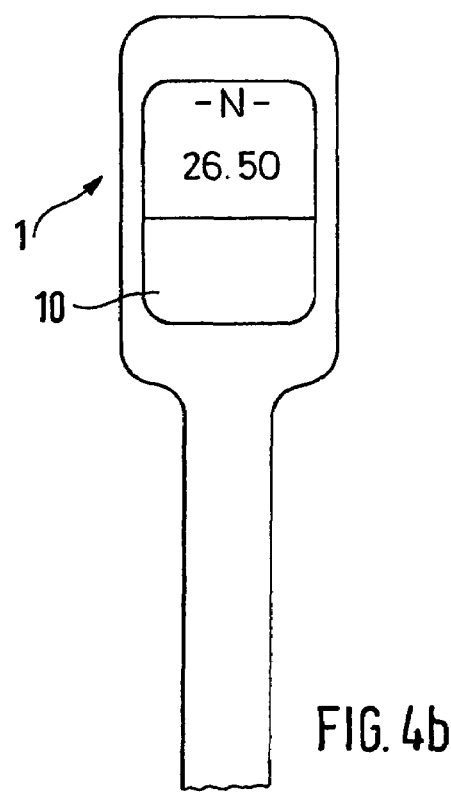

FIGS. 4a and 4b show views of a device 1 according to the invention for adjusting the axial force in screw joints FIG. 4a shows a device 1 according to the invention in the form of a spanner. The latter has a handle 21 which is connected to a component 3 for fixing (a screwing attachment, see FIG. 1). The handle 21 is non-rotatably connected to the screwing attachment 3. Alternatively, it is also possible to provide the spanner as a "ratchet" in which a rotational connection which locks in one direction is provided. Depending on the type of connection, the electrical connection of screwing attachment 3 and handle 1 is also to be chosen. In FIG. 4a it can be seen that the spring 5 is electroconductively attached to the handle 6 to the left of a contact, and this contact is connected by an electrical connection to an indicator 10 which is additionally connected by an earth terminal to the screw joint. Thus changes in electrical resistance in the measuring element 2 are measurable as a change of potential for the indicator 10.

The indicator 10, which belongs to the control device according to the invention, has an alphanumerical optical display for the indication of axial force values existing or adjusted in the screw joint. Here, as soon as the screwing attachment 3 is fitted on the bolt head 7 and the contact pins 14a (and others) are pressed onto the measuring element 2, values for the axial force existing in the screw joint are provided.

Naturally, other indication options are possible too, for example, by a pilot lamp for providing an ordinary limit value, or acoustic indications.

Figure 5A:
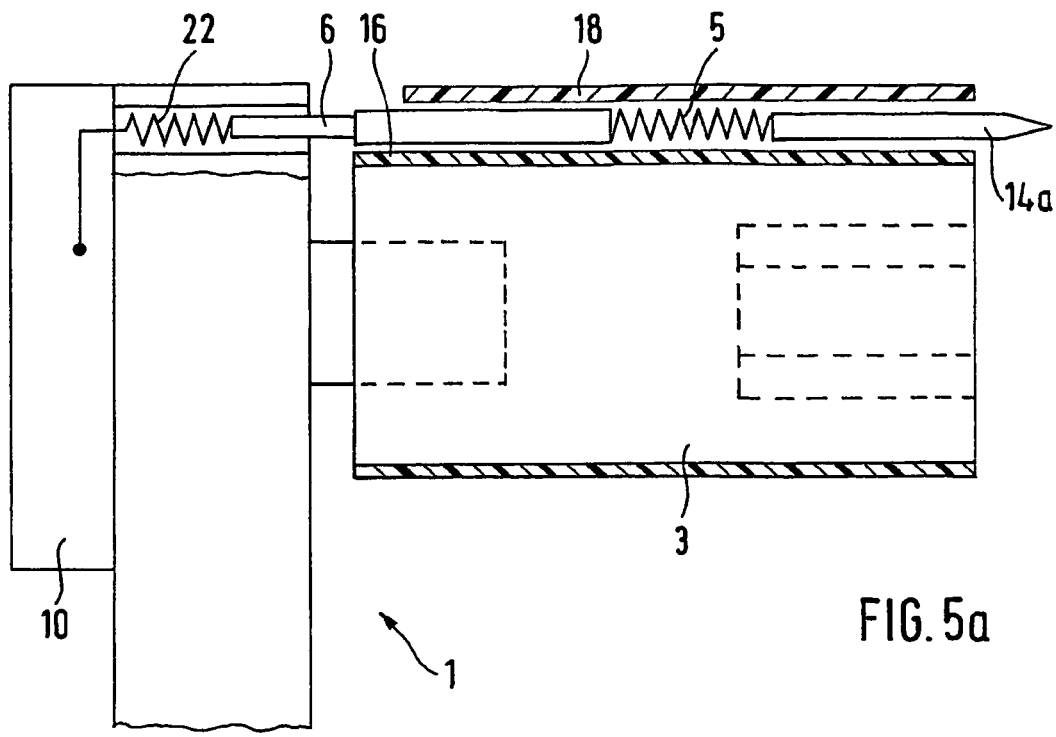
Figure 5B:
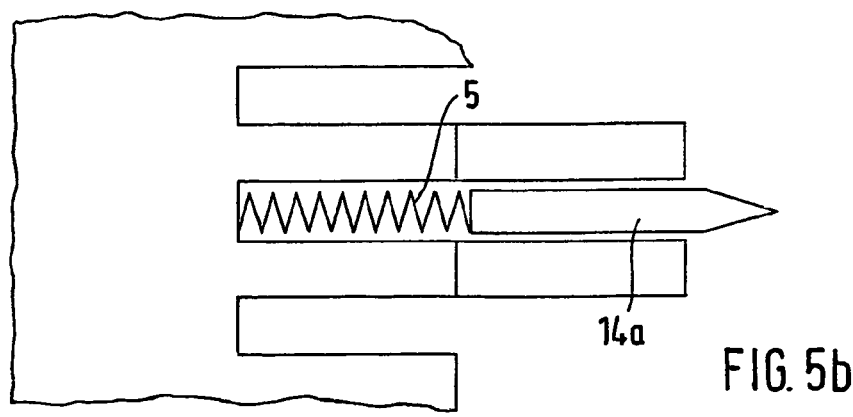

FIGS. 5a and 5b show further details of the device according to the invention. In FIG. 5a is again shown the screwing attachment 3 (as a box spanner). The insulating layers 16 and 18 enclose, in the manner described above, an annular space from which the contact pins 14a etc. are pushed out to the right by the relaxed spring 5 for making contact with a measuring element 2. The spring 5 or an electrically conductive element arranged to the left of the spring connect to the electrical contact 6 for electrical connection to the indicator 10. The contact 6 is constructed as a pin which is pushed by the spring 22 out of the handle 21 of the spanner, to improve electrical contact with the pin 14a.

FIG. 5b shows a further arrangement of the annular space, in which the contact pin 14a is shown as an example. Here is shown a turret arrangement in which several contact pins are distributed over the circumference of the annular space.

Figure 6:
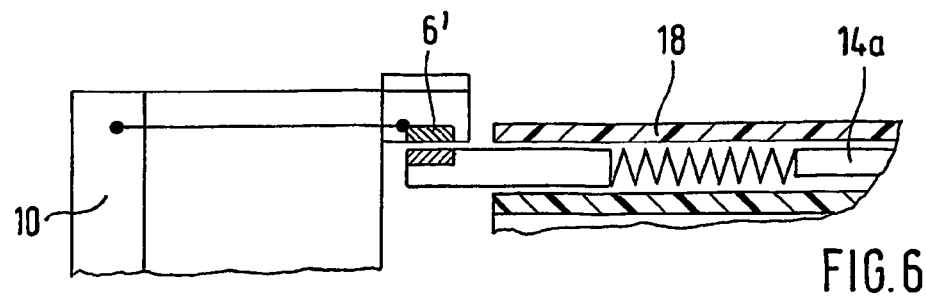

FIG. 6 lastly shows a further type of connection between box spanner 3 (to which belong the means for signal value pick-up, that is, contact pins with insulators located round them). A component electrically connected to the contact pin 14a by the spring 5 can here too be contactlessly connected to a contact 6' on the handle 21. The contact 6' is here too connected by a terminal wire to the indicator 10. Between the contact 6' and the electrically conductive element shown to the left of the spring 5 is provided a gap via which capacitive or inductive coupling can take place (see also the introduction to the specification). Alternatively, of course, galvanic coupling is always possible as well.

The device shown in the figures is a device 4 for adjusting and testing the axial force in screw joints, wherein the device includes a check device for limiting an axial force operating between force-applying elements of the screw joint, wherein the check device comprises means 4, 5 for signal value pick-up from a measuring element 2 whose electrical resistance is variable as a function of the operative axial force, wherein the device comprises a component 3 for fixing a rotatable force-applying element and the component 3 for fixing a rotatable force-applying element is designed to fix a bolt head 7, a nut 8 or the like, and the means 4, 5 for signal value pick-up are likewise accommodated in the component 3 for fixing a rotatable force-applying element, for contacting a washer 2 arranged between the force-applying elements.

Hence devices which can be handled and with which, for example, in an industrial plant, the axial force of a bolt can be adjusted to the desired amount, are provided in particular for practical use. Here it is particularly advantageous that wholly commercially available bolts can he used, which do not have to be coated with additional force transducers etc. either. To determine the force there is used a washer 2 which, on account of its large circumference (the latter must inevitably be larger than the bolt shank), allows averaging of the data. This averaging is on the one hand to be established on the basis of the wide spatial extent of the washer and also on the basis of the plurality of several contact pins 14 which can come into contact electrically with the washer 2. In this case it must also be taken into consideration that, on account of the rotation of the component 3, spring mounting of the contact pins is sensible to compensate for unevenness of the washer during rotational movement. Also it is sensible to make the washer so rotationally symmetrical that the tips of the contact pins can slide over it and yet at the same time can transmit electrical currents.

The invention claimed is:

1. A device for adjusting and testing the axial force in screw joints, comprising:
    a first force applying element in the form of a bolt, a nut, or the like, and further comprising a thread;
    a second force applying element complementary to the thread;
    a measuring element in the form of a washer contacting the first force applying element or the second force applying element, wherein the measuring element comprises a piezoresistive coating of an amorphous, diamond-like, carbon compound, said peiezoresistive layer or coating comprising graphitic structures with $sp^2$ hybridization in combination with diamond-like structures with $sp^3$ hybridization, such that the electrical resistance of the measuring element is continuously variable as a function of the axial force applied by the first force applying element or the second force applying element to the washer; and
    a component for fixing the first force applying element or the second force applying element and preventing rotation thereof comprising means for contacting the measuring element and for signal pick-up.

2. The device according to claim 1, wherein the means for signal value pick-up comprises contacts for galvanic, capacitive or inductive signal value transmission.

3. The device according to claim 1, wherein the means for signal value pick-up is designed for the simultaneous measurement of one or more signal values.

4. The device according to claim 1, wherein the device provides an electrical connection to the electrical earth.

5. The device according to claim 1, wherein the screw joint comprises force-applying elements or connecting elements between the force-applying elements made of wood, metal or plastic.

6. The device according to claim 1, wherein the fixing component is designed for fixing recessed-head, slotted-head, hexagon, square and Allen-key bolts or the like.

7. The device according to claim 1, wherein a device for acoustic or optical indication of adjusted axial force values is provided.

8. A device for adjusting and testing the axial force in screw joints, wherein the device includes a check device for limiting an axial force operating between force-applying elements of the screw joint, wherein the check device has means for signal value pick-up from an annular measuring element separate and distinct from any force applying elements, but acted on by at least one of the force applying elements, and whose electrical resistance is continuously variable as a function of the operative axial force applied to the screw joint, wherein the annular measuring element comprises a hollow circular cylinder, the hollow circular cylinder comprising, on the upper or lower side thereof, at least one piezoresisitive layer or at least one coating of an amorphous, diamond like, carbon compound, the at least one peiezoresistive layer or coating comprising graphitic structures with $sp^2$ hybridization in combination with diamond-like structures with $sp^3$ hybridization.

9. The device according to claim 8, wherein the hollow circular cylinder comprises a core of commercial steel, special steel, hardened steel, titanium, aluminum, or glass fiber reinforced plastic carrying the at least one layer or coating.

* * * * *